United States Patent
Christensen et al.

(10) Patent No.: US 7,400,575 B2
(45) Date of Patent: *Jul. 15, 2008

(54) METHOD, SYSTEM AND SERVICE FOR ACHIEVING SYNCHRONOUS COMMUNICATION RESPONSIVE TO DYNAMIC STATUS

(75) Inventors: James Edward Christensen, Cortlandt Manor, NY (US); Edith Helen Stern, Yorktown Heights, NY (US); Arup Acharya, Westwood, NJ (US); Zon-Yin Shae, South Salem, NY (US); Rose Marie Williams, Wappinger Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/844,400

(22) Filed: Aug. 24, 2007

(65) Prior Publication Data

US 2007/0286384 A1    Dec. 13, 2007

Related U.S. Application Data

(63) Continuation of application No. 10/707,900, filed on Jan. 22, 2004.

(51) Int. Cl.
*H04L 12/26* (2006.01)

(52) U.S. Cl. .................. 370/217; 370/219; 370/220; 370/389; 379/201.02

(58) Field of Classification Search ............. 370/381, 370/389, 392, 217, 219, 220; 709/203–206; 379/127.01, 201.01–201.02, 207.04, 207.14, 379/211.01, 216.01, 355.01, 196–199
See application file for complete search history.

(56) References Cited

U.S. PATENT DOCUMENTS

| | | | |
|---|---|---|---|
| 5,416,473 A | 5/1995 | Dulaney, III et al. | |
| 5,493,692 A | 2/1996 | Theimer et al. | |
| 5,544,231 A | 8/1996 | Cho | |
| 5,872,841 A | 2/1999 | King et al. | |
| 5,889,845 A | 3/1999 | Staples et al. | |
| 6,088,435 A * | 7/2000 | Barber et al. | 379/205.01 |
| 6,219,694 B1 | 4/2001 | Lazaridis et al. | |
| 6,330,320 B1 | 12/2001 | Cornell et al. | |
| 6,373,817 B1 | 4/2002 | Kung et al. | |
| 6,463,463 B1 | 10/2002 | Godfrey et al. | |
| 6,731,732 B2 | 5/2004 | Creamer et al. | |
| 6,751,307 B2 | 6/2004 | McAlinden | |
| 6,774,796 B2 | 8/2004 | Smith | |
| 6,807,563 B1 | 10/2004 | Christofferson et al. | |
| 6,839,417 B2 | 1/2005 | Weisman et al. | |
| 7,058,167 B2 | 6/2006 | Gray et al. | |
| 7,072,457 B2 | 7/2006 | Brown et al. | |
| 7,103,172 B2 | 9/2006 | Brown et al. | |
| 7,120,668 B2 | 10/2006 | Manber et al. | |
| 7,139,390 B2 | 11/2006 | Brown et al. | |
| 7,162,256 B2 | 1/2007 | Seligmann et al. | |

(Continued)

*Primary Examiner*—Wing F. Chan
*Assistant Examiner*—Mark A. Mais
(74) *Attorney, Agent, or Firm*—GIbb & Rahman, LLC; Eustus D. Nelson, Esq.

(57) ABSTRACT

A method for routing a communication connection request includes the steps of obtaining context information from a communication connection requester in response to a communication connection request. The steps further include using the context information to determine a communication connection action, and connecting the communication connection requester based upon the connection action.

25 Claims, 6 Drawing Sheets

U.S. PATENT DOCUMENTS 7,184,539 B2 2/2007 Colson et al.
7,289,522 B2 * 10/2007 Gallant ..................... 370/401

2003/0025603 A1 2/2003 Smith

* cited by examiner

METHOD, SYSTEM AND SERVICE FOR ACHIEVING SYNCHRONOUS COMMUNICATION RESPONSIVE TO DYNAMIC STATUS

CROSS-REFERENCE TO RELATED APPLICATIONS

This application is a continuation of U.S. application Ser. No. 10/707,900 filed Jan. 22, 2004, the complete disclosure of which, in its entirety, is herein incorporated by reference.

FIELD OF THE INVENTION

The present invention relates to the field of providing synchronous communication, specifically it relates to achieving synchronous communication with a target based on the context of the calling party.

BACKGROUND OF THE INVENTION

Traditional telephony relies on the use of telephone numbers to route call requests to a desired recipient. 800 numbers, 900 numbers, group pickup, call forwarding, all allow a specific desired recipient or group of recipients, to be reached based on digits dialed by the calling party, which then undergo number translation (e.g. to a regional 800 destination), or predetermined fan-out (as in group pickup).

800 numbers are implemented in the Public Switched Telephone (PSTN) system via a lookup on a database resident on a Signaling Control Point (SCP). This database maps an 800 number to a physical telephone number. This is accomplished through Signaling System 7 (SS7) signaling which takes the digits entered by the user, and invokes a lookup on the number translation database. The physical PSTN number that is returned is used to do the connection setup. Lookup for 900 calls is similar except for the charging mechanism. Both 800 and 900 number translations rely on a pre-determined (ignoring dynamic personal state) translation. 800 numbers and 900 numbers require that the calling party dial the digits associated with the desired call recipient.

Call forwarding is a service whereby the terminating switch on the path to the called party replaces the original number with a second number that is programmed by the owner of the original number. Call forwarding is thus another form of number translation that is programmed by the end user. Call forwarding requires that calling party dial the digits associated with the desired call recipient.

Call centers are a way that many operators can respond when customers dial a single phone number. Offered by enterprises, or as a telecom service, an incoming call is routed to an Automatic Call Distributor (ACD) which can then routed the call to one of many physical telephones. The selection of a target telephone may be done by one of many algorithms including longest idle, or skills based routing. Target phones traditionally have been collocated with the ACD, but advances in communication have made distributed call centers feasible. Call centers are generally employed by enterprises or by carriers (e.g. for directory assistance). Call centers are reached when the calling party dials the digits associated with that termination.

Traditional telephony requires that the calling party enter an identification indicating the desired recipient in order to make this connection—either a telephone number, a speed dial sequence such as *n where n is a digit or digit string (usually only one or two digits), a spoken name previously associated with a dial number (e.g. as in voice activated dialing), etc. The advent of VoIP protocols such as H323 and SIP (session initiation protocol) allows this to be extended past the traditional PSTN to internet protocol (IP) addresses or other allowed designations; VoIP protocols extend the telephony paradigm to the IP world. To reach an IP destination, a calling user must provide an indication of the desired party to be reached.

The Telephone Number Mapping standard, called ENUM, is a specification to map telephone numbers from the Internet. For a "voice over IP" (VoIP) call, (which by definition originates on the Internet side) that aims to reach a PSTN user, the VoIP call must terminate at a IP-PSTN gateway. ENUM allows for dynamic selection of such a gateway based on the destination PSTN Number. ENUM lookups are accomplished via DNS; in this case, the DNS (Domain Name System), which is the host/service naming and lookup scheme used in the Internet, maps a PSTN number to the name of the Internet host that serves as a gateway to the desired PSTN number.

CTI or computer-telephony integration refers to programming a PSTN interface connected to a computer; a computer is typically connected to a data network, and thus providing a PSTN interfaced card allows a computer to interact with the PSTN network. CTI basically enables a computer to act as an endpoint of the PSTN network, i.e. it appears to be a phone to the PSTN network. The aim of CTI, as the name suggests, is to enable computer applications to be extended to use services from the PSTN network.

The use of a person's location in communications and computer applications is not uncommon today. Users of cell phones are offered services tailored to the location of the cell phone. Examples include emergency 911 calls, movie listings for local theaters, traffic conditions, nearby gasoline sales, etc. The Hertz Company equips some of its rental cares with an interactive device that uses the rental car's location to offer navigation clues to the driver. Research labs have prototyped electronic tour guides on mobile devices for museums, small cities, and retail stores that also use device location to tailor end user services.

We're also used to communications applications that use the context of the person who is the intended target of a communiqué to influence a communications request. A simple example is the busy signal that we've all heard with we attempt to phone someone who's already on the phone. Newer variations on that theme can be experienced when one attempts to contact a person's mobile communication device. For example Nextel's so called DirectConnect® phones chirp in different ways depending on the state of the target person's device.

Communications applications can also show some information about the calling party. For example many phone services offer a feature known as caller ID that provides the calling parties telephone number.

Data from a myriad of physical sensors can extend context beyond location and device activity. Examples include atmospheric measurements, light level, sound pressure level, audio feature analysis, weight and pressure, motion detectors, magnetic door and window switches, etc. Personal medical sensors can also provide data on a variety of physiological measures including pulse rate, blood pressure, body temperature, electronic impulse activity and resistance, etc. A familiar example of such an application is the so-called lie detector machine.

Context-aware computing has included message and call delivery, based on recipient (eg called party). Two examples are the Etherphone system from Xerox® Parc and Active Badge system from Olivetti®, both of which route an incoming call based on the called party's location. The Active Messenger system (AM) from MIT routes an incoming message to a suitable device near the called party, e.g. pager, phone, fax. However, the routing in these cases is not done based on attributes of the caller.

Traditional telephony requires that the calling party recall numbers or access codes for desired called parties. With many potential called parties this becomes difficult. Speed dialing provides simple access, but still requires that the calling party recall access codes and further requires a prior number selection and association with the speed dialing code. What is needed is a way to simplify access for the calling party to reach appropriate called parties, responsive to current calling party status, such as expected appointments.

Voice calling requires that the calling party recall names or designations of called parties. With many potential called parties, this becomes difficult. What is needed is a way to simplify access for the user to appropriate recipients.

Calendars may be available on different devices including paper calendars, PDA based calendars and so on. These can allow a user to determine the appropriate person to call based on expected appointments, but these may require reading, reentering numbers into a phone, and so on. What's needed is a way of reaching people based on caller context (eg expected appointments).

Further, determining an appropriate person may require an understanding of roles and assignments. What's needed is a way of reaching such called parties based on their roles, independent of their phone number or IP address.

Rules based routing—Calls once received (e.g. at a help desk) may be routed to an appropriate destination (e.g. operator) based on rules such as time of day (for night shutdown), based on perceived content of the call (e.g. based on origination, route to appropriate operator with correct linguistic skills), based on calling line id (eg route to assigned CRM rep for this customer). This mechanism is all called side determined. What is needed is a way to determine a called objective based on callers context.

What is needed is a method and system which makes it easier to use corporate data, such as calendar information, assignment lists, etc. to make more effective voice calls; and which uses the context to both the called and calling parties.

SUMMARY OF THE INVENTION

Disclosed is a method and system for allowing a user to request a synchronous connection, for example a voice call connection, to an appropriate party determined by the context of the user initiating the call. Whereas the prior art identifies the party to be called by having the call initiator provide an identifying number (for example a phone number or PIN number for the called party), the present invention selects the party to be called based on the caller's identification and awareness of the caller's situation.

In an embodiment of the invention, the connection details are determined by awareness of the calling situation (context). The context of the calling party includes but is not limited to both corporate and personal data obtained from (1) calendars, (2) the location, activity and network address of personal devices such as cell phones, office phones, home phones, laptop and desktop computers, automobiles, etc., (3) special-purpose sensors that detect motion, sound, light, pressure, etc. deployed in spaces frequented by the call participants, and (4) RFID readers that detect the presence of companion devices (for example RFID tags) that have been provisioned with identification numbers associated with the call participants.

In a still another embodiment, the invention permits delivery of the communication responsive to the called party context which may include the same sources as detailed above for the calling party. An object of the present invention is to require a single action from the calling party to completely specify the target and connection details for the call.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION OF THE INVENTION

Figure 1:
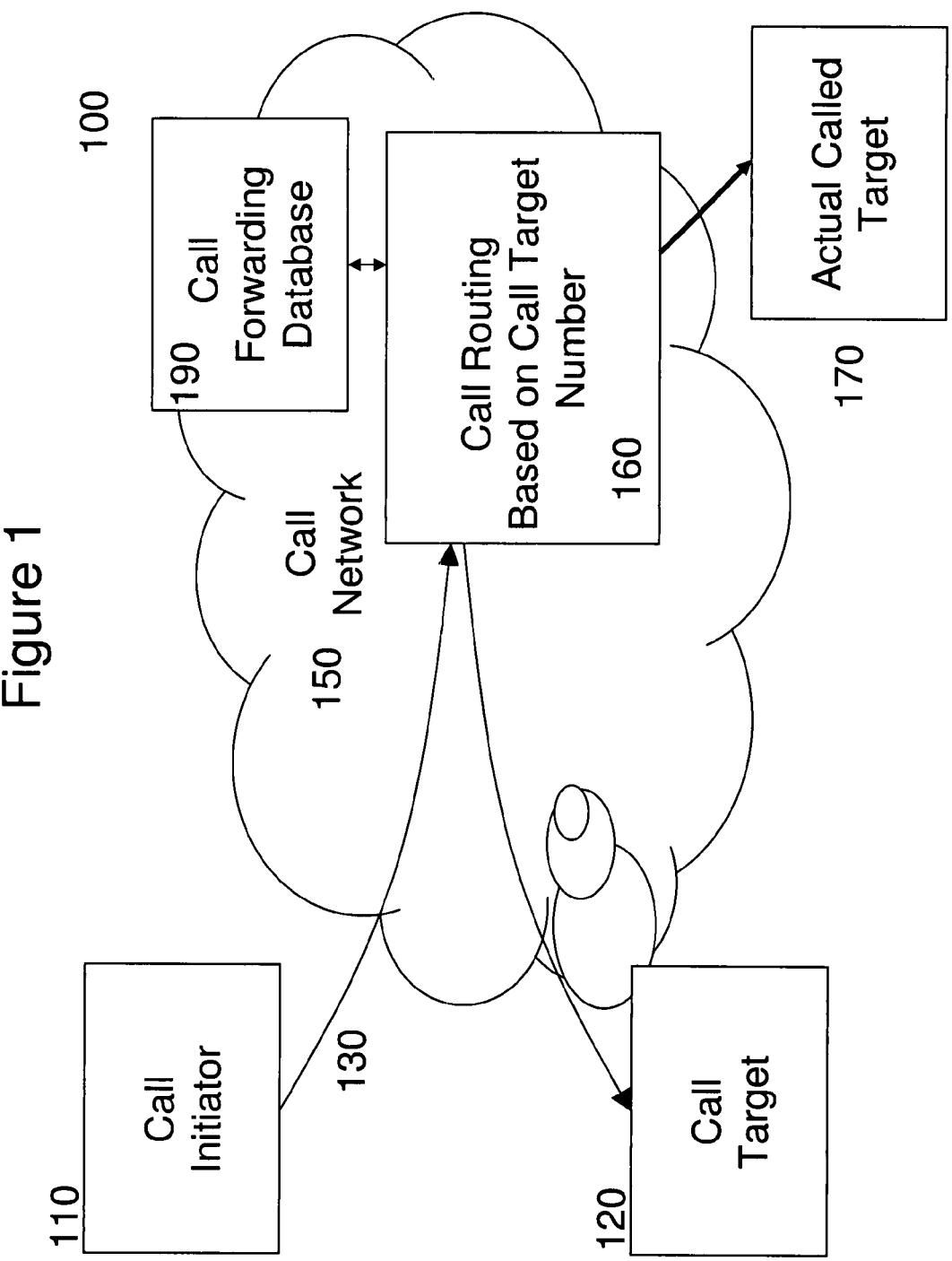
FIG. 1 illustrates a telephone dialing system according to a conventional dialing system.

Before a detailed description of the invention, it can perhaps be best understood by a couple of illustrative examples of its use.

Example 1

A cell phone user (calling party) in the car wants to join his or her currently calendared conference call. The calling party doesn't know the number. Calling party dials their personal number, and is connected to the call. The inventive system here has received the indication that the calling party has dialed in, has retrieved calendar information, has analyzed the calendar information and determined that the calling party is supposed to be attending a voice conference call, and has initiated the conference call (including entering the password).

Example 2

A cell phone user (calling party) has a meeting scheduled with a colleague but is late. The calling party doesn't know the colleague's number. The calling party dials their personal number, and is connected to the call. The inventive system here has received the indication that the calling party has dialed in, has retrieved calendar information, has analyzed the calendar information and determined that the user is supposed to be meeting a specific colleague, has accessed context (e.g. presence information) related to the colleague, has determined a method of reaching the colleague for a synchronous communication, and has initiated the synchronous communication.

Example 3

A repairman (calling party) is out in the field and is about to finish his job. He dials his number and is connected to his next appointment. The repairman doesn't know who the appointment is with. The inventive system here has received the indication that the calling party has dialed in, has retrieved assignment information (eg to-do list), has analyzed the assignment information, determined that the number of the next assignment permissible for this time of day (eg if homeowner is only there between 11 and 1, and the time of day is now 12:45, indications are that this one should be skipped and the repairman directed to the next assignment), and has initiated the call.

Example 4

An employee is at home working on a cable modem. He is supposed to join a conference call with e-meeting. He dials his number and is connected the conference call; the e-meeting content pops up on his screen. The employee doesn't know the number. The inventive system here has received the indication that the calling party has dialed in, has retrieved calendar information, has analyzed the calendar information and determined that the calling party is supposed to be attending a voice conference call, and has initiated the conference call (including entering the password). Further, presence information regarding the calling party shows that they are "up" on the cable modem and therefore available for the e-meeting data. The data is retrieved (based on the calendar info) and pushed to the screen. Note that a colleague may dial into the same conference, but if the presence information does not indicate the availability of a high bandwidth connection may not receive the e-meeting data, or may receive a transcoded version appropriate to the nature of their connection.

Example 5

A patient calls the hospital, or the doctor's office, and identifies and authenticates herself (for example she keys in her identity code and password). Based on her context (for example her medical condition, patient record, her doctor's notation about whether she calls only when necessary, the time of day), she is able to directly reach the physician. When she is connected to the physician, her electronic patient record is transmitted to the doctor's PDA.

In these examples, the calling party is identified by the personal number that is dialed. This is to provide ease of use, but a similar service may also be provided by dialing a common number. Identification of the calling party can be provided via calling line ID (which then restricts callers to a single device), or other means. Some of these means can also be used to provide security. For example, identification may be via speaker identification or other biometric identification, which can also provide authentication information. Further security can be provided by requiring a password. Further, security can be preferentially applied—if a calendar entry is confidential, it may require an authentication step, and otherwise no security may be required.

FIG. 1 shows a functional diagram of a traditional phone dialing system. Element 110 is a device used by the person or PC program initiating the phone call. Element 110 sends out a dialing signal 130 consisting of the phone number (or the IP address) of call target element 120. The signal format 130 can be SS7 for PSTN phones, as well as SIP or H323 signaling for VoIP phones and PC softphones. The call network element 150 can perform the possible call routing services 160 (e.g., call forwarding) based on this call target phone number or IP address. The call network element 150 can be TDM circuit switch network or IP network. The call routing service elements 160 can be the TDM circuit switches or the application servers in the IP network. The locations of the routing service elements 160 can be centralized or distributed. The call routing service element 160 can then decide based on internal pre-configured database 190 to route the call to the call target 120 or forwarding the call to the actual called target 170.

Figure 2:
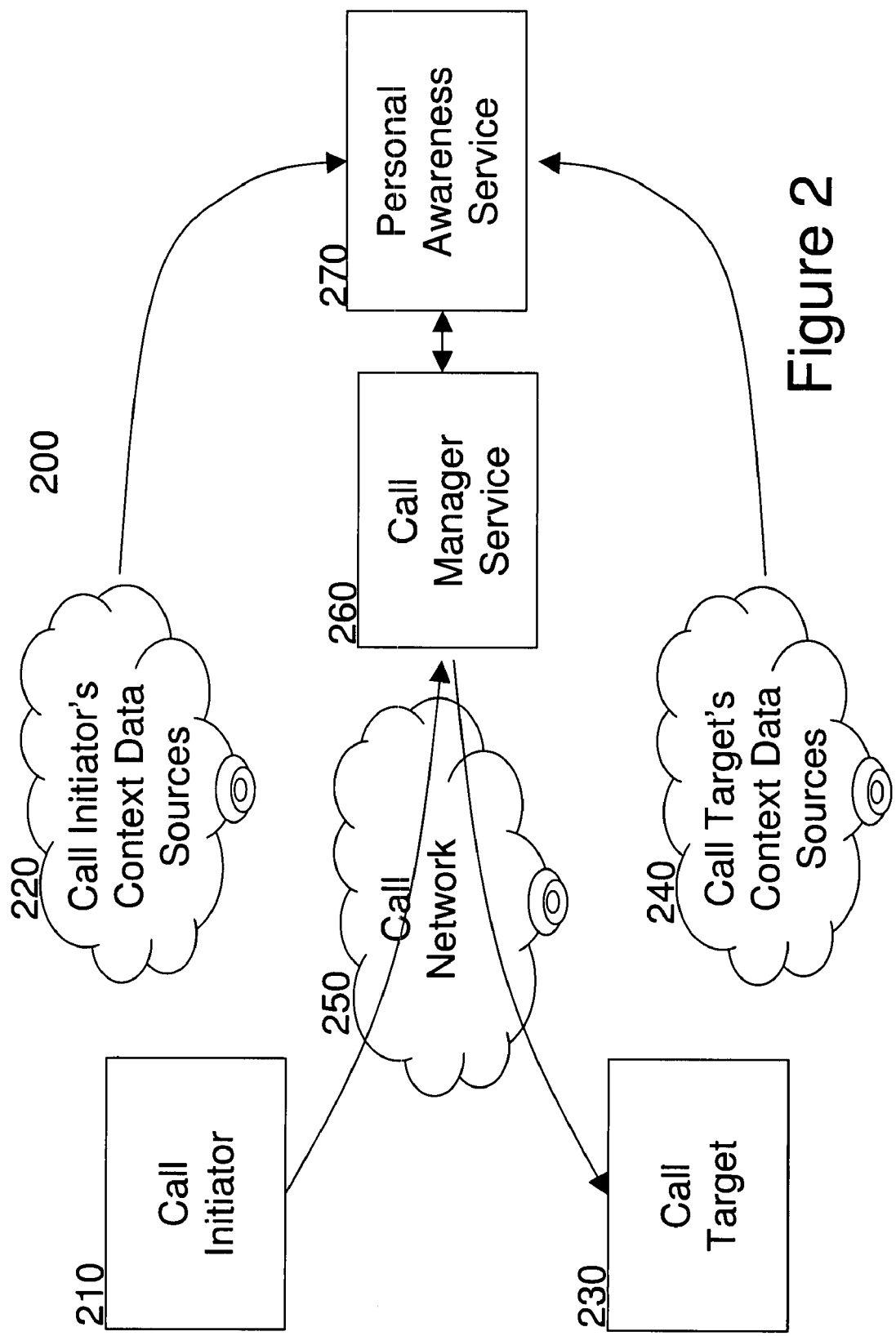
FIG. 2 illustrates an inventive system according to an embodiment of the present invention.

FIG. 2 shows an inventive system 200 according to an embodiment of the present invention. Element 210 is a device used by the person initiating the phone call which is capable using the network element 250 to inform a call manager element 260 of the request to make a phone call. Element 210 can be a wire line or wireless telephone, a laptop or desktop computer with a wired or wireless network connection and telephone software, or any physical object with an embedded telephony capability (for example, automobiles, clock radios, set top boxes, video games, etc.). The call network element 250 is any collection of wireless and wired components capable of communication with the call participant's phone call elements 210 and 230, and also capable of using the phone call manager service provided by element 260. Element 260 is a network-based service capable of identifying the initiator of the call, and determining that person's context using another network-based service shown as element 270. If the call request triggers an associated action, the network service provided by element 260 is capable of managing it. Network service element 260 can be provided by a dedicated or shared computer running appropriate software and having hardware interfaces to network element 250. Identification of the person initiating the call can use any of the existing methods for this purpose, including individual access number, passcodes and PIN numbers, passwords, biometric data and voice analysis, etc.

Network service element 270 can also be provided by a dedicated or shared computer running appropriate software and having hardware interfaces to network elements 220 and 240, and provides for the accurate identification, storage, and aggregation of personal data that can be used to remain aware of the context (situation) of the participants in the call. The network elements 220 and 240 include computing and sensing technologies that are aware of the call participant's (1) calendars, (2) the location, activity and network address of personal devices such as cell phones, office phones, home phones, laptop and desktop computers, automobiles, etc., (3) special-purpose sensors that detect motion, sound, light, pressure, etc. deployed in spaces frequented by the call participants, and (4) RFID readers that detect the presence of companion devices (for example RFID tags) that have been provisioned with identification numbers associated with the call participants. Note that element 240 is optional in the inventive system. An embodiment of the present invention can be realized without element 240. Inclusion of element 240 provides additional opportunity to tailor the communication to the state of the target call participant.

Figure 3:
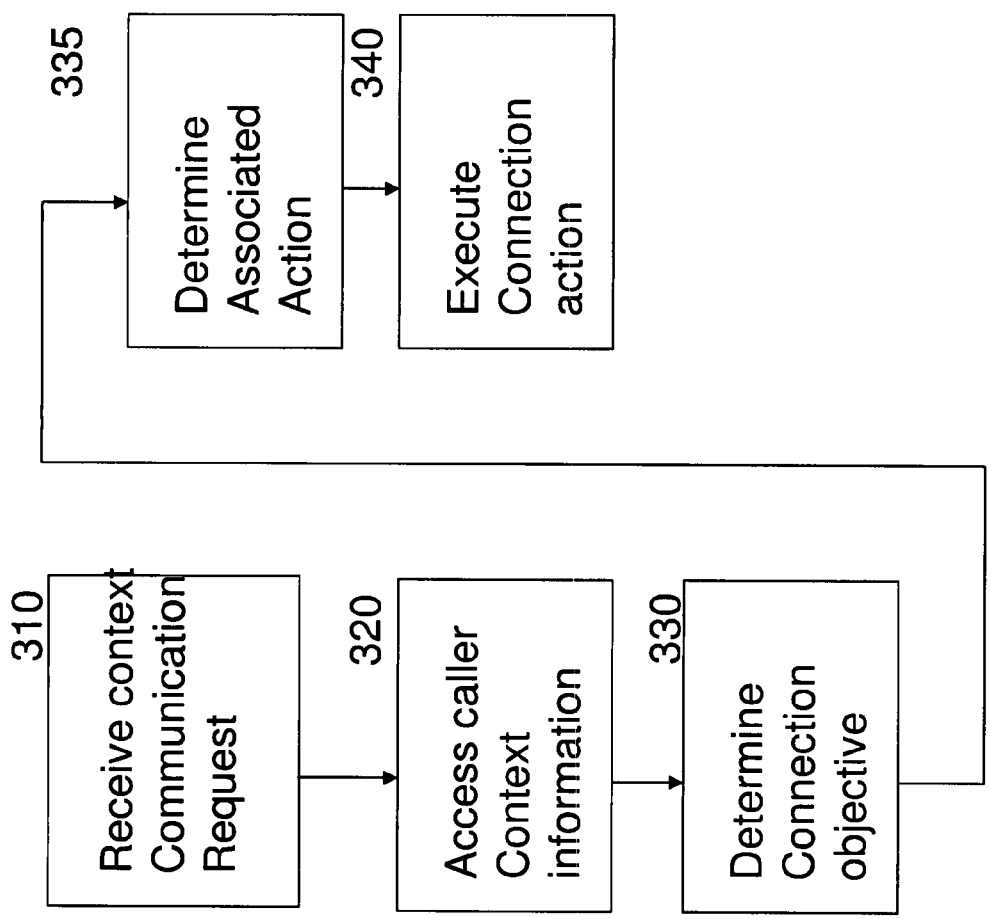
FIG. 3 shows a flowchart of an embodiment according to the present invention.

FIG. 3 describes a method according to an embodiment of the present invention. We begin with block 310, and receive a context communication request. Receiving a context communication request may entail receiving digits or access codes from a telephone handset, wired or wireless. This includes but is not limited to a user dialing a personal communication number (e.g. a 7 or 10 digit number which is the same for all calls), speaking a command, depressing a button or touch screen on such a device. Alternately, it may include receiving a single user action such as clicking a button on a screen, indicating a selection on a PDA.

The context communication request differs from a caller placing a normal call in that the normal call requires the indication of a connection target, or called party. The called party is indicated either by dialing digits representing the called number, by using abbreviated dialing, voice dialing, or in the case of a VoIP connection potentially indicating a VoIP destination IP address. Such digits or other indications differ with the target of the call. However, the context communication request does not change.

We continue with block 320. Details of block 320 may be found in FIG. 4. In block 320 we identify the initiating or calling party, and access context information related to the calling party. Such information includes but is not limited to (1) corporate or personal information including calendars, (2) the location, activity and network address of personal devices such as cell phones, office phones, home phones, laptop and desktop computers, automobiles.

In block 330, responsive to the context accessed in block 320, we determine a connection objective. Details of this may be found in FIG. 5. A connection objective includes but is not limited to a conference call, a person, a room, or a role. Determining may be based solely on calling party context, or may include iterative processes based on initial connection objectives and mediated by called enterprise or called party policy, availability, connectivity or other factors. In one embodiment, the connection objective is determined based on calling party calendar. In a second preferred embodiment, the connection objective is dynamically determined based on role and assignment data. That is, in this embodiment, the connection objective may be determined based on enterprise work force practices including optimization of mobile workforce.

In block 335 we determine an action associated with the connection objective. The action may be determined based on connection objective or may be based on at least one of calling party context, history of previous connections between the calling party and the connection objective, called party context (including role), personal or enterprise policy, rules or algorithm. The action may be determined by rules associated with at least one of the calling party, an entity associated with the calling party such as calling party enterprise, a service associated with the calling party. The action may include but is not limited to transmitting data (including image data), transmitting a pointer or URL allowing data access, creating a log record, instigating a notification to the connection objective, instigating a notification to a third party.

As an example, a calendar entry may include the words: "Call Dr. Doe to discuss X-RAY for Jane Smith". The connection objective would be Dr. Doe, and the associated action, determined by analyzing the calendar entry, would be to transmit the latest x-ray associated with Jane Smith to Dr. Doe in conjunction with completing the connection action. Had the calendar entry specified "Call Mrs. Smith to discuss x-ray of her daughter Jane Smith" the associated action determined would be different.

The associated action may be taken before the connection action, in parallel with the connection action, or after the connection action as determined by the algorithm determining the associated action.

In block 340 we execute a connection action to reach the connection objective determined in block 330. Once the connection objective is determined, a connection action is further determined. Such an action may be based on table or database lookup or may be mediated by called party context including but not limited to location, called enterprise or called party policy, availability, connectivity, connections status or other factors. A connection action may include but is not limited to dialing a telephone number, initiating a VoIP connection, connecting to a voice mail box, redirecting a call, connecting to a conference or connection service. If the connection action fails, error correction may take place.

Intermediate results may be logged and used for management and maintenance purposes as well as for better resolution of connection objectives for future connections.

Figure 4:
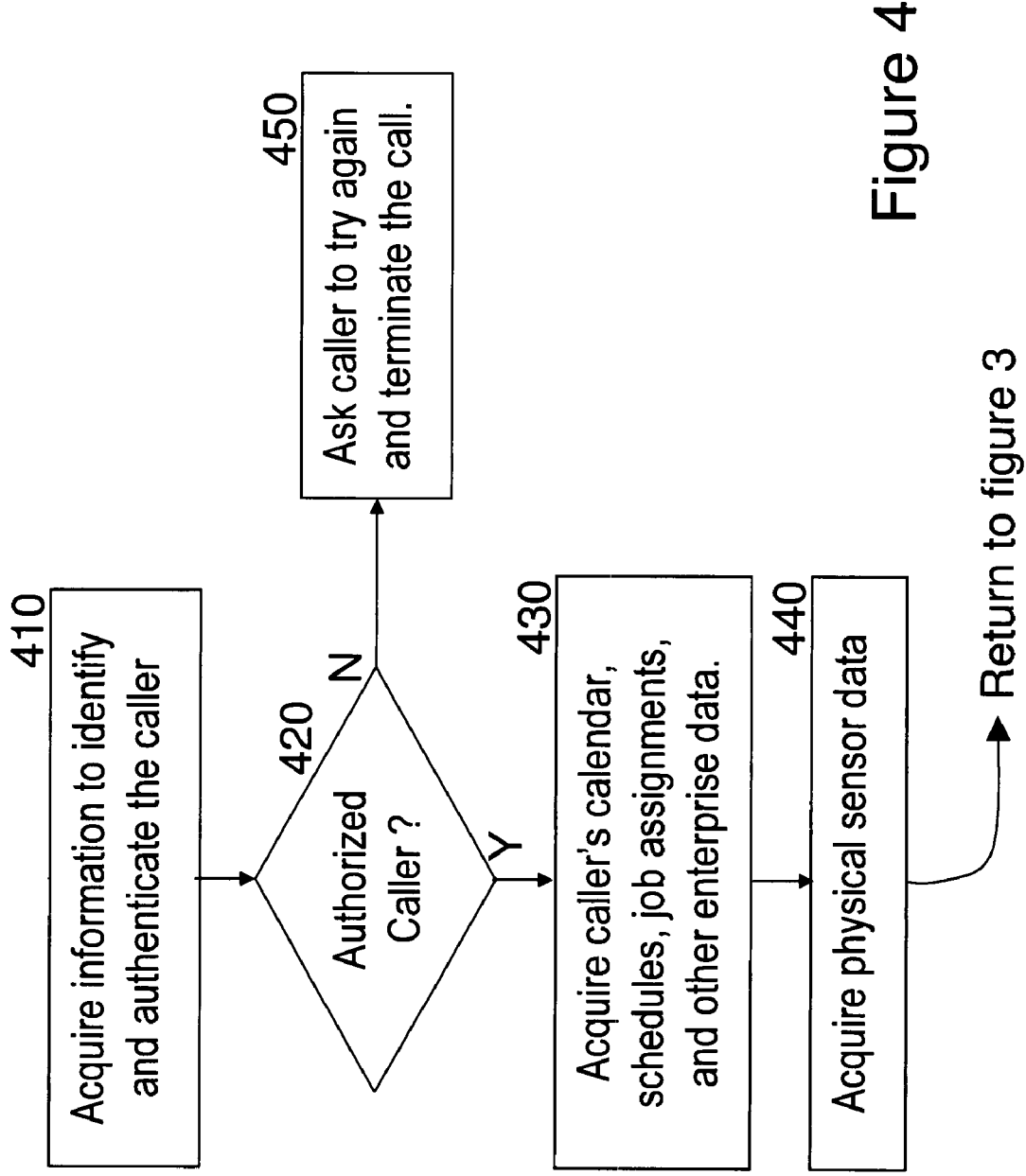
FIG. 4 shows a flowchart for accessing caller context information according to an embodiment of the present invention.

FIG. 4 provides details of block 320. FIG. 4 describes the part of our inventive method that identifies the caller and obtains relevant context about the caller. In block 410 we acquire information to identify and optionally authenticate the caller. Identification information can include calling line identification, identification codes, analysis of voice audio data for the purpose of identification, personal telephone access numbers that are unique for each potential caller, unique codes embedded in personal devices (for example cell phone SIM codes), and biometric measures including fingerprint recognition, face recognition, iris recognition, and hand geometry. The identity of the caller may be authenticated using simple passwords or passcodes, or more elaborate schemes using public key encryption technology (for example digital signatures and certificates). In block 420 the personal identification and authentication data obtained from the caller is compared with a store of registered users that enumerates authorized users and privileges, and can be used to validate the identification and authentication data obtained from the caller. If the caller fails the identification, authentication, and or authorization tests, the call is terminated as shown in block 450. In an embodiment, calls reaching block 450 may be transferred to an operator, or begin a process which employs alternate identification and authentication methods.

For callers passing the test in block 420 our method next acquires personal context information as shown in block 430. This includes data from corporate and personal calendars, entries from relevant schedules and job assignment ledgers, and the like. It is noted that this data may be obtained from a single store, or may be aggregated from a set of stores and network services.

In block 440 the caller's context supplement is with real-time sensor data. Relevant data includes but is not limited to (1) the time of day and the caller's time zone, (2) the caller's location as determined by GPS (global positioning system) coordinates, the location of relevant communication network resources (for example TCP/IP subnets), cellular towers, and the like; (3) data from special-purpose sensors that detect motion, sound, light, pressure, etc. deployed in spaces frequented by the caller (for example in the caller's automobile); and (4) personal medical sensors that report the caller's physiological state.

The flowchart returns back now to block 330 of FIG. 3.

Figure 5A:
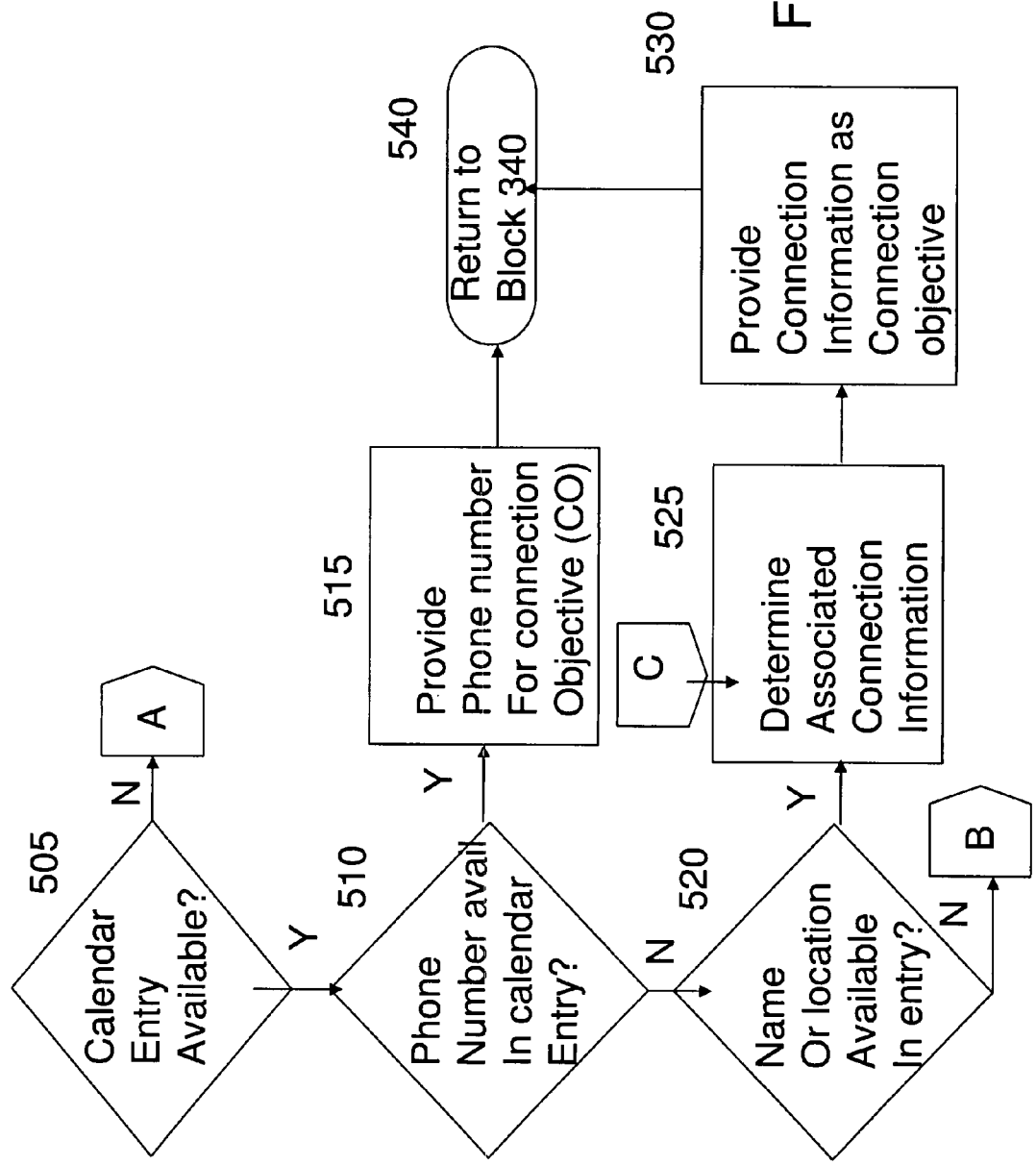
FIGS. 5A and 5B show flowcharts for determining a connection objective according to an embodiment of the present invention.
Figure 5B:
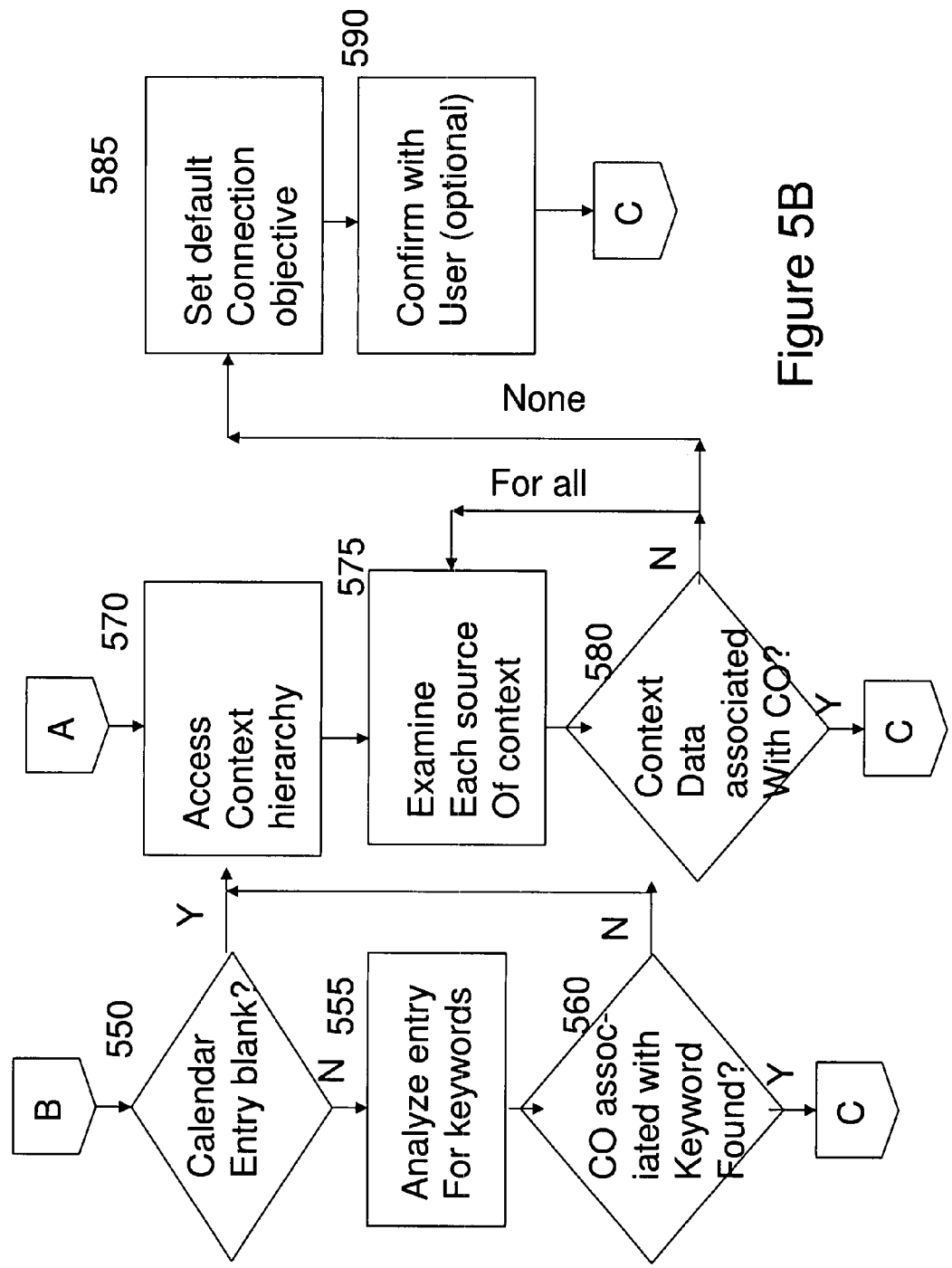

FIG. 5A describes the method for determining a connection objective. In an embodiment, as shown in FIG. 5, first is considered the user calendar entries as the most important context. Other context is considered after calendar. In another embodiment, a confidence factor, within block 330, is associated with all connection objectives based on the manner in which they are determined. Only connection objectives exceeding a preset threshold are utilized in forming connections without further user validation.

Beginning with block 505 and using the context information accessed in FIG. 4, if a calendar entry is available for the current or approaching time period for this caller, we proceed to block 510. If a calendar entry is not available, we proceed to the A marker, and block 570 on FIG. 5B.

Block 510 examines the calendar entry. Calendar entries may be freeform or may abide by one of several accepted or ad-hoc standards. Information in the calendar entry may accessible via XML, via keyword or through interpretation of structure. In block 510 we analyze the calendar entry to determine if there is a telephone number target within the entry. If the calendar entry is freeform, then text analysis can be used to identify the telephone numbers within the entry. Note that there may be multiple phone numbers (eg a phone number associated with the secretary that set up the meeting or call). Keyword analysis, semantic analysis, user history and other techniques can be used to identify the correct number from among several which can be dialed for the user to successfully initiate the action referenced by the calendar entry. While we discuss telephone numbers in block 510, it is clear that IP addresses or other data descriptions can also be used to indicate a destination objective. Analysis in block 510 is intended to refer to not only telephone number determination but also other forms of data address determination.

If the decision in block 510 was that a target telephone number is available, we proceed to block 515 and provide the phone number as a connection objective (CO). In block 540, we return to the process of FIG. 3 and block 340.

If the decision in block 510 was that a target number was not available, we proceed to block 520. In block 520, we analyze the calendar entry to determine if there is a target name or location available in the entry. This can be determined by text analysis techniques of varying sophistication, from looking for capital letters beginning a name, to looking for keywords such as "conference room", to more sophisticated analysis.

If in block 520 we determine a name or location we proceed to block 525. Here we associate a connection objective with the name or location found in block 520. If the target is an employee of the same enterprise, a directory lookup may serve to find the correct connection objective (eg phone number, IP address). Other data sources may be used to match the name or location with a connection objective including but not limited to calling party profile or records, calling party call history, customer records (eg "talk to Harry" may be resolved as a desire to call Harry Jones, a customer assigned to the employee making the call), directory assistance (eg "meet Joe at the Westchester Marriott" may result in determining the phone number for the Westchester Marriott through a commercially available directory assistance service). While we discuss telephone numbers in block 525, it is clear that IP addresses or other data descriptions can also be used to indicate a connection objective. In addition to phone numbers or IP addresses, the connection objective may be determined to be a connection service. That is, through explicit entry or through corporate policy, the connection objective determined from the calendar entry may resolve to providing connection to an enterprise or third party service which will then complete the required actions. The connection service may be one that actively connects to another target endpoint, or passively waits for others to connect to the service with the same objective, and join all of the callers (as commonly experienced when dialing into a conference call). We proceed from block 525 to block 530, and provide connection objective information, and then to block 540. In block 540, we return to the process of FIG. 3 and block 340.

If the decision in block 520 was that no name or location is available we proceed to block 550. Decision block 550 determines if any information is available in the calendar entry. If the entry is blank, we proceed to block 570.

If the entry is not blank, we proceed to block 555 and examine the entry for keywords. For example, the entry may say "Meeting for project Alpha", or "Call broker". Text analysis determines which of these are potential indicators of connection objectives. In a preferred embodiment, terms in calendar entries are checked against a list of keywords. Terms are units of text including but not limited to words, abbreviations, or special symbols. Keywords can be created manually or automatically. Examples of automatic knowledge profile creation from which such keywords can be harvested may be found in the products of companies such as Tacit Knowledge (www.tacit.com).

Proceeding to block 560 and seek to associate a connection objective with the keyword. For example, a group of colleagues may be associated with project Alpha, and a connection objective of a conference call with all of them may be determined. As a second example, while the method may conclude that "broker" is a keyword, no further detail and therefore no connection objective may be determined. As described for block 525, the connection objective may be a connection service. If in block 560 we have associated a connection objective with at least one keyword found, we proceed to block 525, and perform the processing already discussed.

If in block 560 we do not associate a connection objective with a keyword, or have found no keywords, we continue to block 570 and access a context hierarchy. If calendar is the only context to be employed in the method, then the hierarchy is empty and we proceed to block 585.

This hierarchy describes what sources of context are to be examined next in order to determine a connection objective.

For example, in an appliance repair business, "gold" customers may be given a specific appointment, while other customers must wait their turn. The repairmen in such a company have calendars representing appointments they must keep, and when no appointment is scheduled are free to handle the next customer. In this example, to initiate a confirming call before visiting, the inventive method first considers calendar, then role (repairman), location and assignments (to determine the next customer to be seen). While FIG. 5 describes a preferred embodiment of a context hierarchy to be considered, it is clear that an alternate implementation of the inventive method may employ not a hierarchy of context sources, but instead use a rules engine which analyzes data from multiple context sources to determine a connection objective.

In blocks 575 and block 580 we consider the context from the sources established in block 570, and examine caller context to determine a connection objective. If a connection objective is determined for any of the sources of context, we proceed to block 525 and the processing described. If no connection objective is determined, we continue to block 585.

In block 585 we set the default connection objective, and in block 590 optionally confirm it with the user. The default connection objective may be established through user profile, corporate policy, or other means. The default connection objective may provide a call termination point for subsequent conferencing. This enables parties with mismatched calendar entries to engage in "meet me" conferencing. That is, if two parties intend to meet, and only one has placed the appointment on the calendar, the inventive method allows the party without the calendar entry to dial in first and later be conferenced with the appropriate colleague. We return to block 525 and processing described.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. A method for routing a communication connection request comprising the steps of:
   receiving a communication connection request from a communication connection requestor, wherein said communication connection request does not identify a called party;
   in response to said communication connection request, obtaining real-time context information for said communication connection requestor to automatically determine a situation of said communication connection requestor, without input from said communication connection requestor;
   automatically determining a communication connection action using said real-time context information for said communication connection requestor and context information for said called party,
   wherein said real-time context information for said communication connection requestor comprises at least one of a location of said communication connection requestor and an appointment calendar of said communication connection requestor,
   wherein said context information for said called party comprises a called party connectivity, wherein said communication connection action comprises a decision as to who should be called and to whom said communication connection requestor should be telephonically connected without additional input from said communication connection requestor, and wherein at least one of an identification of said called party and contact information for said called party is unknown to said communication connection requestor; and
   connecting said communication connection requestor based upon said connection action, wherein said determining of said communication action is performed prior to said connecting of said communication connection requestor.

2. The method according to claim 1, all the limitations of which are incorporated herein by reference, further comprising:
   determining a confidence factor for said connection action; and
   performing said connection in response to exceeding a confidence factor threshold.

3. The method according to claim 2, all the limitations of which are incorporated herein by reference, further comprising the step of validating said connection action with a caller for connections not exceeding a confidence factor threshold.

4. The method according to claim 1, all the limitations of which are incorporated herein by reference, wherein the step of determining a connection action is done with a rules engine.

5. The method according to of claim 1, all the limitations of which are incorporated herein by reference, further comprising the step of providing an indication of an associated action.

6. The method according to claim 5, all the limitations of which are incorporated herein by reference, wherein said step of providing an indication of an associated action further includes the step of having data transmission.

7. The method according to claim 5, all the limitations of which are incorporated herein by reference, wherein said step of providing an indication of an associated action further includes the step of having a notification.

8. The method according to claim 5, all the limitations of which are incorporated herein by reference, wherein said step of providing an indication of an associated action further includes the step of comprises having a workflow initiation.

9. The method according to claim 5, all the limitations of which are incorporated herein by reference, wherein said step of providing an indication of an associated action further includes the step of having a logging action.

10. The method according to claim 5, all the limitations of which are incorporated herein by reference, wherein said step of providing an indication of an associated action further includes the step of directing said associated action to at least one additional connection.

11. The method according to claim 1, all the limitations of which are incorporated herein by reference, wherein said using of said context information for said called party to determine said communication connection action comprises using said context information for said called party comprising; a called party policy; a called party availability; a called party connections status; and at least one of corporate and personal data of said called party from at least one of sensors that detect at least one of motion, sound, light, and pressure deployed in spaces frequented by said called party, radio frequency identification readers that detect the presence of companion devices that have been provisioned with identification numbers associated with said called party, and at least one of a location, activity, and network address of at least one personal device of said called party, comprising at least one of a cellular telephone, an office telephone, a home telephone, a laptop computer, a desktop computer, and an automobile.

12. A method for providing a communication connection for a user comprising the steps of:
   receiving a communication connection request from said user, wherein said communication connection request does not identify a called party;
   obtaining real-time context information for said user to automatically determine a situation of said user, without input from said user;
   determining a communication connection action using said real-time context information for said user and context information for said called party,
   wherein said real-time context information for said user comprises at least one of a location of said user and an appointment calendar of said user,
   wherein said context information for said called party comprises a called party connectivity and a called party connections status, and wherein said communication connection action comprises a decision as to who should be called and to whom said user should be telephonically connected without additional input from said user; and
   connecting said user based upon said connection action, wherein at least one of an identification of said called party and contact information for said called party is unknown to said user, wherein said determining of said communication action is performed prior to said connecting of said user.

13. The method according to claim 12, all the limitations of which are incorporated herein by reference, further comprising:
   determining a confidence factor for said connection action; and
   performing said connection in response to exceeding a confidence factor threshold.

14. The method according to claim 13, all the limitations of which are incorporated herein by reference, further comprising the step of validating said connection action with a user for connections not exceeding a confidence factor threshold.

15. The method according to claim 12, all the limitations of which are incorporated herein by reference, wherein the step of determining a connection action is done with a rules engine.

16. The method according to claim 12, all the limitations of which are incorporated herein by reference, wherein said using of said context information for said called party to determine said communication connection action comprises using said context information for said called party comprising a called party policy; a called party availability; and at least one of corporate and personal data of said called party from at least one of sensors that detect at least one of motion, sound, light, and pressure deployed in spaces frequented by said called party, radio frequency identification readers that detect the presence of companion devices that have been provisioned with identification numbers associated with said called party, and at least one of a location, activity, and network address of at least one personal device of said called party, comprising at least one of a cellular telephone, an office telephone, a home telephone, a laptop computer, a desktop computer, and an automobile.

17. A method of routing a caller's phone call comprising the steps of:
   receiving a communication connection request from said caller, wherein said communication connection request does not identify a called party;
   obtaining real-time context information for said caller to automatically determine a situation of said caller, without input from said caller;
   determining a communication connection action using said real-time context information for said caller and context information for said called party,
   wherein said real-time context information for said caller comprises at least one of a location of said caller and an appointment calendar of said caller,
   wherein said context information for said called party data of said called party from at least one of sensors a location of at least one personal device of said called party,
   wherein said communication connection action comprises a decision as to who should be called and to whom said caller should be telephonically connected without additional input from said caller, and
   wherein at least one of an identification of said called party and contact information for said called party is unknown to said caller; and
   connecting said caller based upon said connection action, wherein said determining of said communication action is performed prior to said connecting of said caller.

18. The method according to claim 17, all the limitations of which are incorporated herein by reference, further comprising:
   determining a confidence factor for said connection action; and
   performing said connection in response to exceeding a confidence factor threshold.

19. The method according to claim 18, all the limitations of which are incorporated herein by reference, further comprising the step of validating said connection action said caller for connections not exceeding a confidence factor threshold.

20. The method according to claim 17, all the limitations of which are incorporated herein by reference, wherein the step of determining a connection action is done with a rules engine.

21. The method according to claim 17, all the limitations of which are incorporated herein by reference, further comprising the step of authenticating the caller before determining said communication connection action.

22. The method according to claim 17, all the limitations of which are incorporated herein by reference, further comprising the step of requiring a single action by a caller for determining said communication connection action.

23. The method according to claim 21, all the limitations of which are incorporated herein by reference, further comprising the step of using biometrics to authenticate said caller.

24. The method according to claim 17, all the limitations of which are incorporated herein by reference, wherein said using of said context information for said called party to assist in determining said communication connection action comprises using said context information for said called party comprising a called party policy and a called party availability.

25. A method for routing a communication connection request comprising the steps of:
   receiving a communication connection request from a communication connection requestor, wherein said communication connection request does not identify a called party;
   in response to said communication connection request, obtaining real-time context information for said communication connection requestor to automatically determine a situation of said communication connection requestor, without input from said communication connection requestor;
   automatically selecting said called party without additional input from said communication connection requestor, wherein said selecting of said called party is based on at least one of real-time context information of said communication connection requestor and context information of said called party, wherein said real-time context information for said communication connection requestor comprises at least one of a location of said communication connection requestor and an appointment calendar of said communication connection requestor, and wherein at least one of an identification of said called party and contact information for said called party is unknown to said communication connection requestor; and
   establishing a communication connection between said communication connection requestor and said called party, wherein said selecting of said called party is performed prior to said establishing of said communication connection.

* * * * *